Sept. 24, 1968            P. WILLEMS            3,402,897

DEVICE FOR THE OSCILLATING TREATMENT OF SUBSTANCES

Filed Aug. 17, 1964            2 Sheets-Sheet 1

United States Patent Office 3,402,897
Patented Sept. 24, 1968

3,402,897
DEVICE FOR THE OSCILLATING TREATMENT OF SUBSTANCES
Peter Willems, Lucerne, Switzerland, assignor to Forschungs-Institut Prof. Ing.-Chem. P. Willems, Lucerne, Switzerland
Filed Aug. 17, 1964, Ser. No. 389,941
Claims priority, application Switzerland, Aug. 21, 1963, 10,389/63
15 Claims. (Cl. 241—46)

ABSTRACT OF THE DISCLOSURE

A disc type comminuting agitator having a configuration such that the substance being treated is caused to move in an extremely turbulent manner. The comminution is effected by knife or hook-shaped projections on the extremity of the disc.

---

The present invention relates to a device for the oscillation treatment of substances, particularly for disaggregation, dispersion, homogenizing, emulsifying, dissolving, conveying or similar treatment of substances and/or mixtures for initiating or accelerating respectively chemical reactions of the various types between more or less reactive materials or compounds and/or for an improved execution of processes usual in the chemical technique or in respect of substances of all the aggregate states and of the most different structure.

In accordance with the present invention there is provided a rotary drive shaft having at least one disc mounted thereon which disc is provided with a series of sector-shaped portions extending from the axis of the shaft to its periphery with the sector-shaped portions forming a wavy intersecting line with a coaxial right cylinder and the undulations of said continuous sector-shaped portions extending on opposite sides of a plane normal to the axis of shaft rotation.

The surprisingly intensive effect of such a device is based mainly on the generation of waves in a material having the tendency to flow or in a streaming material and on the simultaneous intensive conveying of the medium beyond the periphery area of the disc. By the surface areas inclined towards the rotation plane of the disc, which can be imagined in the form of a diametral folding or bending of the disc respectively there are obtained on the surface of the said disc sucking and conveying effects, which propagate themselves within the medium according to the number of revolutions and the number of the oblique planes of the disc first as thrust waves in the medium and which act secondly also concomitantly in an essentially centrifugally accelerating manner and have thus a pumping effect. Thereby it is possible to generate according to the configuration of the container of the disc containing the medium, an extremely intensive turbulence within the medium, which possibly accelerates considerably the desired process, e.g. a chemical reaction.

According to an embodiment of the invention, the disc is configurated in such a way, that the peripheral intersection point of a right cylinder coaxial with the axis of rotation of said disc is provided with undulations extending on opposite sides of a plane normal to the axis of rotation.

A further embodiment is to be seen in such a configuration, that the line of intersection of a cylinder jacket surface with the disc has the shape of saw-teeth.

A particularly strong turbulence within the medium can also be produced by means of the disc when the disc is rotated in it, if the said disc is provided with suitable openings, e.g., round, oval or cornered. Through these openings the medium passes, when the disc is rotated, according to the direction of rotation of the disc from the one side of the disc to the other or vice-versa respectively. Thereby streams are developed within the medium, which pass extremely in an arcuate path through the said medium, which streams can lead parts of the medium through a high substance column in different directions.

With a particular embodiment the openings are provided in each case with upstruck surface areas, with the upstruck portions extending in the same direction of inclination with one another.

The surface areas of the disc may be provided with knife-shaped, hook-shaped or other projections of a similar form. Thereby a particularly intensive disruption or cutting of, e.g. solid, lumpy or fibrous, thixotropic or elastic structures in liquids may be obtained.

For a further increase of this effect the projections may be sharpened or provided with ripping points.

The device according to the invention makes possible in a particularly intensive manner also the treatment of viscous or thixotropic media in large containers if on a common rotating shaft several of the above described discs are arranged at an axial distance from each other. Such discs mounted on a common shaft are then combined according to the purpose in similar or in different embodiments.

According to a special embodiment teeth are provided at the periphery of a disc. Thereby a very intensively acting, particularly cutting and dispersing effect is obtained.

The teeth provided on the periphery are preferably alternately set at a different angle or arranged in different rotational planes.

If a disc is mounted in a casing, it can be seen that the pumping effect caused by the disc which leads will produce generally a circulation stream in the direction of rotation of the medium within the casing or container.

For this purpose it is favourable if the jacket surface of the casing is arranged very near the circumference of the disc. The inlet- and outlet-opening of the casing may, thereby, be arranged in a similar manner as is the case with centrifugal pumps.

According to a further development also the front walls of the casing are arranged in the direct vicinity of the axially outer ranges of a disc.

The inner jacket of the casing may be provided with toothing, against which the disc throws rough, chunky, fibrous or other material, so that this material is torn and cut on the inner jacket.

In a further embodiment the inner jacket of the casing as well as also the circumference of the discs may be provided with teeth which are complementary and arranged in such a manner, that they engage into each other.

In a specific embodiment of the invention a stator cage provided with interruptions is arranged around the periphery range of the discs.

A supplementary description of the invention is given hereinafter on the basis of several embodiments together with the diagrammatic drawing.

Figure 1:
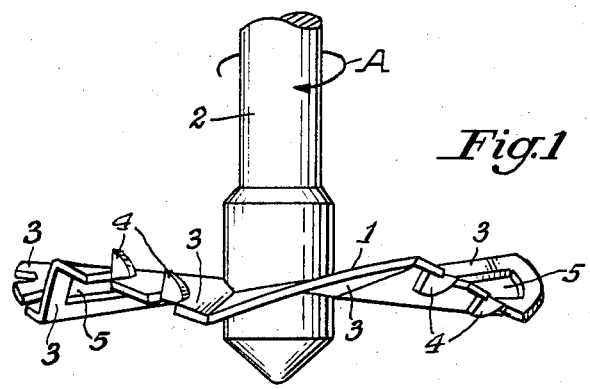
FIG. 1 illustrates a first embodiment of a disc according to the invention.

FIG. 1 shows a disc 1 mounted rigidly on a drive shaft 2 which is rotated by a motor (not shown) in the direction of the arrow A. The disc 1 comprises circle sector shaped areas 3 which are inclined in alternately opposite directions relatively to the rotation plane of the disc 1 in such a manner that the line of intersection with the surface of a coaxial cylinder is saw tooth-shaped. In the surfaces having a specific inclination the disc 1 has projections 4 bent upwardly out of the material of the disc at right angles thereto, while the surfaces with an inclination in the opposite direction having openings 5.

The manner of working of the disc 1 may be assumed to be such that the substance to be treated glides over the disc, e.g. on the surface of the sector area 3 and thereafter impinges on the sector surface following next in the rotational direction, whereby a part of the substance passes from one side of the disc to the other through the openings 5 so that the substance subjected to the pounding action of the disc is changed continuously and a strong progress of the homogenisation effect is obtained. Any rough material which may be contained in the substance is torn by the projections 4. The projections 4 may be sharpened or provided with ripping tips.

Figure 2:
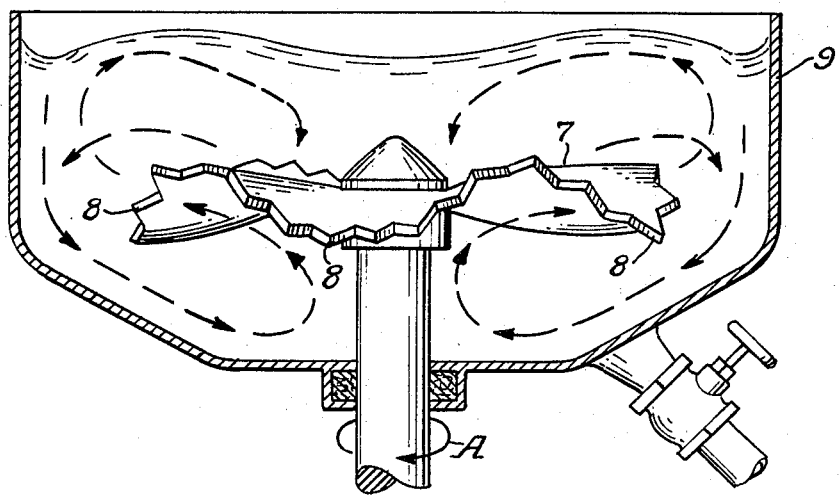
FIG. 2 illustrates a second embodiment of a disc arranged in a container.

FIG. 2 shows an embodiment, in which on the periphery of disc 7 teeth 8 are provided. Thereby an intensive, shearing and dispersing effect is obtained, which leads to a circulation stream of the treated medium in the container 9. Such a device has a more intensive pump effect as, e.g., blades of a circular saw, as the teeth provided on their periphery run always in the same path, so that their special range of operation and the kinetic or hydrodynamic work performance are low. They are able only to a limited extent to generate within the medium, particularly if this latter is of a higher viscosity or even thixotropy to generate an intensive pumping action, circulation or turbulence. As compared with this the device according to FIG. 2 acts through the combination of the high frequency waves, the centrifugal acceleration, the cutting and dispersing of the medium thrown beyond the circumference with its teeth over a range, which corresponds about to the axial extent of the periphery range of the disc. Thereby a very intensive pumping action is obtained, which effects the circulation of also hardly flowing agents with greater relations of the diameter of the container to that of the disc.

Figure 3:
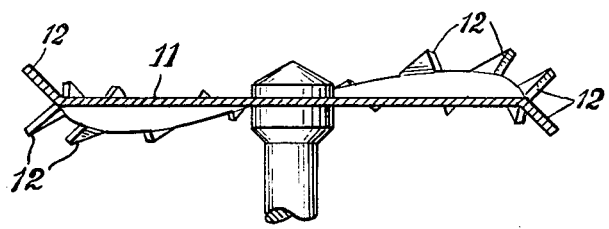
FIG. 3 is a side view, partially in section, of a further disc.

FIG. 3 shows an embodiment of the invention, in which the disc 11 is provided with a series of teeth 12 on its periphery, whereby the teeth 12 are set at different planes, e.g., are offset alternately in an axial direction in an opposite sense as compared with the disc.

The teeth may be of different shape.

Figure 4:
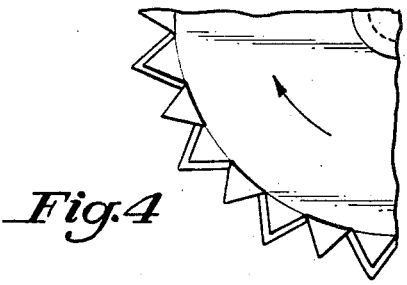
FIGS. 4 and 5 show two different forms of teeth.

FIG. 4 shows, e.g., a disc having a series of teeth with nearly equilateral triangular teeth.

Figure 5:
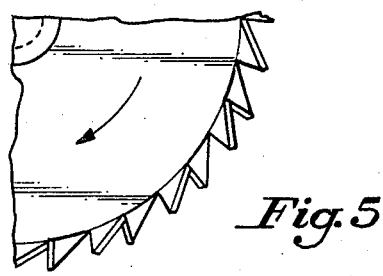

The disc according to FIG. 5 shows teeth extending in the direction of rotation, which have a stronger tearing effect on the medium, particularly on lumpy components of the said medium.

Figure 8:
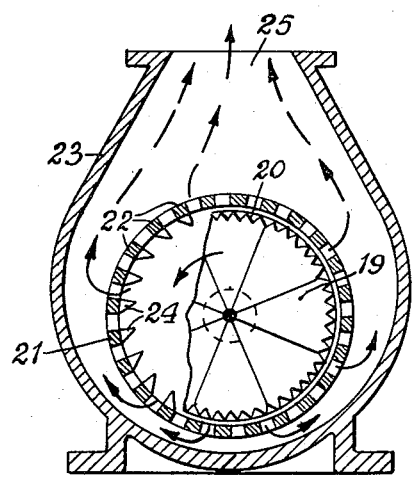
FIG. 8 is a front sectional view of still another embodiment of the invention.

FIG. 8 shows in a perspective representation the disc 16, which is particularly suitable for use in narrowly engaging cases.

Figure 6:
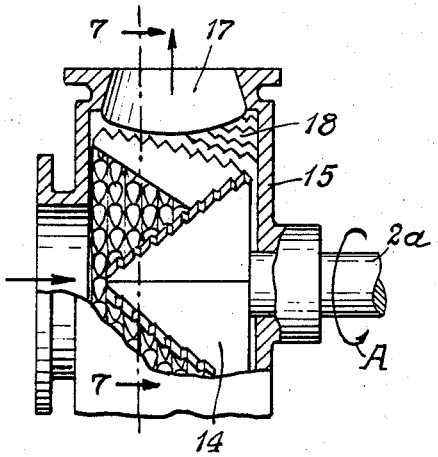
FIG. 6 is a side view, partially in section, of another disc mounted within a casing.

FIG. 6 shows a further particularly effective embodiment of the invention, in which the inner jacket of the container 15 is provided with teeth 18. When operating the device, the disc 14 throws the medium, e.g., rough, lumpy, fibrous, wooden or plastic material as pulp, plastic, spun material on the inner jacket 22 and tears and cuts it there, whereupon it is pushed out under pressure through the outlet 17.

Figure 7:
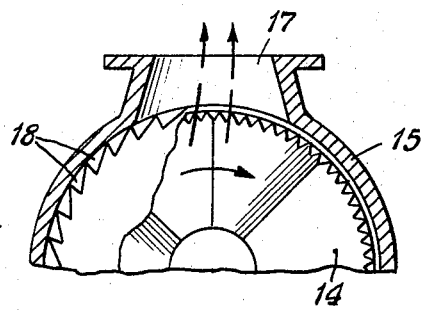
FIG. 7 illustrates a partial vertical section taken along the line 7—7 of FIG. 6.

FIG. 7 shows a section through the device according to FIG. 6. Here particularly the container teeth 15, as well the teeth on the rotor disc 14 are shown, which latter is fastened to the drive shaft 2a.

The device shown in FIG. 8 serves as a dissolving and dispersing device for mixtures, which are difficult to treat, very viscous, thixotropic or fibrous or very heterogenous, e.g., not sorted waste paper or the like. This device comprises a folded disc 19 with 8 sector shaped surface areas, which are provided on the circumference with teeth 20. This disc is arranged in a cage 21, the jacket of which consists of parallel or twisted rods 22 and which are fastened interchangeable to the casing 23 of the said device. On the rods 22 of the cage 21 there are fastened toothed rings 24 which are interchangeable preferably singly, by groups or as a totality, between which the teeth 20 of the rotor disc 19 engage, so that the rough medium is torn and dispersed between the teeth of the rotor disc and of the stator cage. The teeth on the rods of the cage may also be omitted so that the mixture is treated in the work gap between the rotor teeth and the stator rods. By different teeth adapted to the structure of the medium and to the purpose of treatment and by different distances between them any desired treatment of the medium may be obtained, in a careful or in a very intensive manner, possibly adding neutral or chemical additives, reactants, catalysers, solvents, detergents, bleaching and impregnating substances, gases, solid or powdery substances, etc.

As is shown in FIGURE 8, the effect of the device according to the invention can still be increased considerably by a particular configuration of the container surrounding the device, which from the area opposite to the outlet 25 towards this outlet has an increasing radial distance from the circumference of the disc, so that the ejection of media which are hard to pump, is essentially facilitated.

The device may be arranged with its rotational axis in a vertical, horizontal or in any other position according to its purpose. In some embodiments, e.g. according to FIG. 8, a receiving container may be provided in the lower part of the device, possibly with a device for the periodical draining of the contents or for the continuous draining for specifically heavy parts of the mixture as e.g. metal parts, iron etc., whereby simultaneously a cleaning of the substance takes place.

As was already cited above, the centrifugal acceleration of the medium which is obtained by the simple or multiple folding of the disc, plays an important part in the high intensity of the device, because in front of the rotating folded disc a high frequency pressure way system of cylindrical to conical shape is formed, which system propagates itself within the medium and further propagates to some distance in front of the disc and rotates with it narrowly in front of the disc with merely the same rotational speed and with increasing distance from the disc with a gradually diminishing speed. The kinetical power of the rotating folded disc propagates itself, however, depending upon the configuration of the disc according to the invention if necessary more in a radial direction from the periphery of the disc or possibly starting from the surfaces of the folded sectors more in an axial direction. Thereby all the necessary ratios of the different performances of the features of the disc may be adjusted by combined cooperation.

While the invention has been described and illustrated with reference to specific embodiments thereof, it will be understood that other embodiments may be resorted to without departing from the invention. Therefore, the forms of the invention set out above should be considered as illustrative and not as limiting the scope of the following claims.

What I claim is:

1. A device for the oscillating treatment of pumpable substances, comprising in combination a rotary drive shaft, at least one rotatable disc mounted rigidly on said drive shaft to substantially rotate in a plane normal to the axis of said shaft, said disc having continuous adjacent surface sectors inclined alternately in different directions with reference to said plane of rotation of the disc, and hook-shaped projections extending from said disc to generate periodical oscillations in the substance surrounding said rotating disc.

2. A device according to claim 1, wherein the disc is shaped in such a manner that its line of intersection with the surface of a coaxial right cylinder would be wavy with the undulations extending on opposite sides of said normal plane of rotation.

3. A device for the oscillating treatment of pumpable substances, comprising in combination a rotary drive shaft, at least one rotatable disc mounted rigidly on said drive shaft to substantially rotate in a plane normal to the axis of said shaft and thereby generate periodical oscillations in the substance surrounding said rotating disc, said disc having continuous adjacent surface sectors inclined alternately in different directions with reference to said plane of rotation of the disc, and tooth-like projections extending from said disc, said projections being provided with edges extending in directions different from radial directions for cutting and disrupting the substance into which said projections extend.

4. A device according to claim 3, wherein such projections are knife-shaped.

5. A device according to claim 3, wherein the disc is shaped in such a manner that its line of intersection with the surface of a coaxial right cylinder would be saw tooth-shaped.

6. A device according to claim 3, wherein the projections are provided with ripping tips.

7. A device according to claim 3, wherein teeth arranged on the circumference of at least one disc are set alternately to a different angle.

8. A device according to claim 3, wherein at least one disc is provided with openings.

9. A device according to claim 3, wherein at least one disc is provided with openings, said openings being arranged only on surface areas with the same direction of inclination.

10. A device according to claim 3, wherein the projections are formed by upstruck flaps from the surface of the disc.

11. A device according to claim 3, wherein a casing surrounds the disc, said casing having at least one inlet and one outlet.

12. A device according to claim 3, wherein a casing surrounds the disc, said casing having at least one inlet and one outlet, said casing having a jacket surface which is very near to the circumference of the disc, but without any friction with it.

13. A device according to claim 3, wherein a casing surrounds the disc, said casing having at least one inlet and one outlet, the inner sides of said casing being disposed very near to the axially outer areas of the disc.

14. A device according to claim 11, said casing having a jacket which is provided with teeth.

15. A device according to claim 11, said casing having a jacket which is provided with teeth, the inner face of said jacket and the circumference of the disc being provided with teeth which are complementary to each other and engage mutually.

References Cited
UNITED STATES PATENTS

| | | | |
|---|---|---|---|
| 2,789,799 | 4/1957 | Kaufman | 259—134 |
| 2,794,628 | 6/1957 | Fessenden | 241—46 X |
| 3,168,255 | 2/1965 | Bellows | 241—46 |
| 489,336 | 1/1893 | Siewers | 259—134 X |
| 2,772,079 | 11/1956 | Ernst | 259—134 |
| 3,100,628 | 8/1963 | Norris | 259—134 X |

WILLIAM W. DYER, JR., *Primary Examiner.*

F. T. YOST, *Assistant Examiner.*